T. D. FINIZIO.
BALL JOINT FOR LAMP SUPPORTS AND THE LIKE.
APPLICATION FILED MAY 10, 1915.
1,166,752.
Patented Jan. 4, 1916.
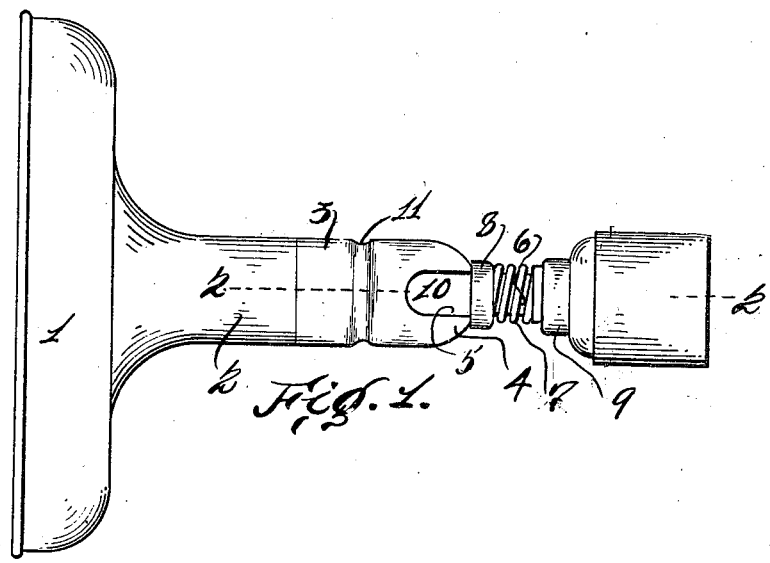
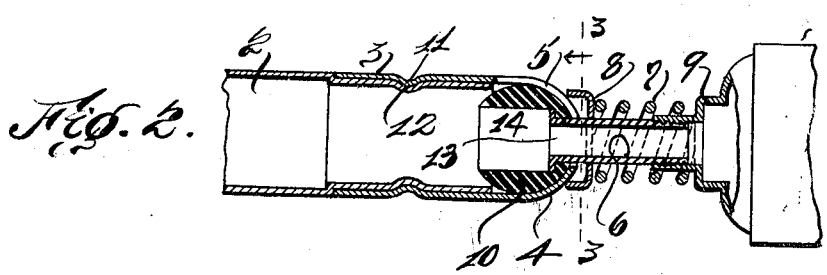
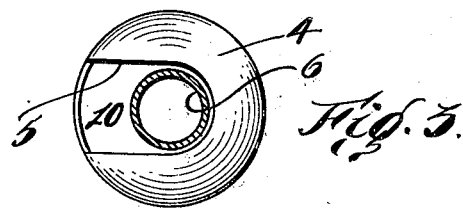
Witness
E. A. Jarvis
Inventor
Thomas D. Finizio
attorney

UNITED STATES PATENT OFFICE.

THOMAS D. FINIZIO, OF NEW YORK, N. Y., ASSIGNOR TO KURZ ELECTRICAL COMPANY, INC., OF NEW YORK, N. Y., A CORPORATION OF NEW YORK.

BALL-JOINT FOR LAMP-SUPPORTS AND THE LIKE.

1,166,752.  Specification of Letters Patent.  Patented Jan. 4, 1916.

Application filed May 10, 1915. Serial No. 27,280.

*To all whom it may concern:*

Be it known that I, THOMAS D. FINIZIO, a subject of the King of Italy, residing at New York city, Bronx county, State of New York, have invented certain new and useful Improvements in Ball-Joints for Lamp-Supports and the like, of which the following is a full, clear, and exact description.

This invention relates to ball or universal joints for lamp-supports and the like, the object of the invention being to provide a ball or universal joint or connection between the base portion and lamp-socket portion of electric-light fixtures arranged to permit the lamp to be moved or adjusted and to be held in an adjusted position without the use of binding screws or other locking devices.

The improvement is adaptable, of course, to other articles than lamps.

My improved ball-joint is arranged so that it will remain in an adjusted position when once set, a pressure exerting device being employed to at all times, force the members of the ball-joint together.

I will now proceed to describe my invention in detail, the essential features of which will be summarized in the appended claims, reference being had to the accompanying drawing, forming part hereof; wherein—

Figure 1 is a side elevation of an electric-lamp fixture having my improvement applied thereto; Fig. 2 is an enlarged fragmentary sectional view, the section being taken on a line 2—2 in Fig. 1; and Fig. 3 is an enlarged cross-sectional view, the section being taken on a line 3—3 in Fig. 2.

As herein illustrated, my improved ball or universal connection is applied to an ordinary lamp fixture base 1 having a tubular neck portion 2, to the outer end of which my improved joint is applied.

My improved joint consists of a tubular member or sleeve 3 rotatably secured to the neck 2. The tubular member or sleeve 3 is provided with a rounded closed outer end 4 provided with a slot 5 to permit the radial movement of a tubular bushing 6 surrounded by a spring 7, one end of which bears against a washer 8, the other end bearing against a lamp-socket 9 or other supporting means. The bushing 6 is carried by a spherical carrier or ball 10 having an opening 14 for the insertion of said bushing, the carrier being preferably made out of insulating material, such as wood, rubber or the like.

The outer end of the bushing 6 is screwed into the socket 9 as shown. The tension of the spring 7 forces the socket 9 and bushing 6 outwardly, and consequently the carrier or ball 10 is forced into frictional contact with the inner surface of the rounded end 4 of the rotary sleeve 3. The spring 7 also forces the washer 8 in contact with the exterior surface of the rounded end of the tubular or rotary sleeve 3; and hence there will also be sufficient pressure exerted to cause the socket 9 and connected parts (the bushing 6 and carrier or ball 10) to remain in adjusted positions, there being no manually operable binding elements employed.

It is evident that the ball-joint described permits the lamp (not shown) to be angularly adjusted, radial adjustment being obtained by rotating the tubular member or sleeve 3. The member or sleeve 3 is held in position by a concaved annular beading 11 which is spun into a recess 12 in the neck 2. The sleeve 3 and neck fit snug enough to require slight pressure to rotate it. The wires for the lamp are of course threaded through the channel 13, when the device is used for a lamp, or if used for a fan or telephone-bracket, the wire for same will also be threaded through the said channel.

With my improved ball-joint, I am able to obtain angular adjustments of the connected member to the extent of at least 45 degrees relative to the axis of the bracket.

Having now described my invention, what I claim and desire to secure by Letters Patent is:

1. In combination with a tubular neck-member, a rotatable sleeve carried by said neck, at its outer end, said sleeve extending, for the greater part of its length, over the end of said neck, an angularly adjustable bushing located in said sleeve, pressure exerting device arranged to hold said bushing in an adjusted position, and a lamp-socket or other supporting means carried by said bushing at its free end.

2. In combination with a tubular neck-member, a rotatable sleeve carried by said neck, at its outer end, said sleeve being rounded at its free end, a ball located within the rounded end of said sleeve, a bushing carried by said ball, said sleeve, at its rounded end being provided with a slot to permit of the angular adjustment of said bushing, a lamp socket or the like carried by said bushing at its outer end, and means carried by said bushing and located between the lamp socket and rounded end of said sleeve to force said ball firmly into contact with the rounded end of said sleeve.

3. In combination with a tubular neck-member, a rotatable sleeve carried by said neck, at its outer end, said sleeve being rounded at its free end, a ball located within the rounded end of said sleeve, a bushing carried by said ball, said sleeve, at its rounded end being provided with a slot to permit of the angular adjustment of said bushing, a lamp socket or the like carried by said bushing at its outer end, and a spring carried by said bushing and located between the lamp-socket and rounded end of said sleeve to force said ball firmly into contact with the rounded end of said sleeve.

4. In combination with a tubular neck-member, a rotatable sleeve carried by said neck, at its outer end, said sleeve being rounded at its free end, a ball located within the rounded end of said sleeve, a bushing carried by said ball, said sleeve, at its rounded end being provided with a slot to permit of the angular adjustment of said bushing, a lamp socket or the like carried by said bushing at its outer end, a washer carried by said bushing contacting with the outer surface of the rounded end of said sleeve, and a spring carried by said sleeve and bearing against said washer at one end thereof and against the lamp socket at the other end thereof.

5. In combination with a tubular neck-member, a rotatable sleeve located on the outer surface and at the outer end of said neck-member, said sleeve being mounted for rotation only, a carrier of insulating material mounted for rotation within said sleeve, a tubular bushing carried by said carrier, said bushing being out of contact with said sleeve, and a lamp socket or other supporting means carried by said bushing at its free end.

Signed at New York city, N. Y., this 7th day of May, 1915.

THOMAS D. FINIZIO.

Witnesses:
 EDWARD A. JARVIS,
 MAURICE BLOCK.